(12) United States Patent
Schmale

(10) Patent No.: US 7,918,507 B2
(45) Date of Patent: Apr. 5, 2011

(54) DEVICE FOR LIMITING THE ADJUSTABILITY OF A VEHICLE SEAT

(75) Inventor: Uwe Schmale, Hückeswagen (DE)

(73) Assignee: Johnson Controls GmbH, Burscheid (DE)

( * ) Notice: Subject to any disclaimer, the term of this patent is extended or adjusted under 35 U.S.C. 154(b) by 201 days.

(21) Appl. No.: 11/664,839

(22) PCT Filed: Sep. 30, 2005

(86) PCT No.: PCT/EP2005/054959
§ 371 (c)(1),
(2), (4) Date: Nov. 6, 2007

(87) PCT Pub. No.: WO2006/040271
PCT Pub. Date: Apr. 20, 2006

(65) Prior Publication Data
US 2008/0143160 A1    Jun. 19, 2008

(30) Foreign Application Priority Data
Oct. 8, 2004 (DE) .......................... 10 2004 049 404

(51) Int. Cl.
*B60N 2/02* (2006.01)
(52) U.S. Cl. ...................... 297/341; 297/378.1; 248/424; 248/429

(58) Field of Classification Search .................. 297/341, 297/378.1, 378.14; 248/424, 429
See application file for complete search history.

(56) References Cited

U.S. PATENT DOCUMENTS

| | | | |
|---|---|---|---|
| 5,820,216 A * | 10/1998 | Feuillet | 297/341 |
| 5,829,728 A | 11/1998 | Hoshihara et al. | |
| 6,254,188 B1 * | 7/2001 | Downey | 297/341 |
| 6,616,233 B1 | 9/2003 | Debus et al. | |
| 6,619,741 B1 | 9/2003 | Tame | |
| 6,923,504 B1 * | 8/2005 | Liu et al. | 297/367 R |
| 7,017,993 B2 * | 3/2006 | Niimi et al. | 297/341 |
| 7,090,188 B2 * | 8/2006 | Severini et al. | 248/424 |
| 2002/0195857 A1 | 12/2002 | Ito | |

FOREIGN PATENT DOCUMENTS

| | | |
|---|---|---|
| DE | 44 27 061 A1 | 2/1996 |
| DE | 696 15 759 T2 | 8/2002 |
| EP | 0 878 344 A2 | 11/1998 |
| FR | 2 797 234 A1 | 2/2001 |

* cited by examiner

*Primary Examiner* — Sarah B McPartlin
(74) *Attorney, Agent, or Firm* — Foley & Lardner LLP

(57) ABSTRACT

A device for limiting the adjustability of a component, in particular, a vehicle seat is provided. The device has an adjustment range, running in the longitudinal direction of a vehicle wherein the adjustment range comprises a first forward partial range and a second rear partial range. If the component is adjusted to a functional position that is different from the normal position, the device limits the adjustability of the component to the first partial range.

28 Claims, 1 Drawing Sheet

DEVICE FOR LIMITING THE ADJUSTABILITY OF A VEHICLE SEAT

CROSS-REFERENCE TO RELATED PATENT APPLICATIONS

The present application is a National Stage of, and claims the benefit of, International Application No. PCT/EP2005/0549595 filed on Sep. 30, 2005, which claims the benefit of German Patent Application No. DE 10 2004 049 404.5 filed on Oct. 8, 2004. The entire disclosures of International Application No. PCT/EP2005/0549595 and German Patent Application No. DE 10 2004 049 404.5 are incorporated herein by reference.

BACKGROUND

The disclosure relates to a device for limiting the adjustability of a component, in particular a vehicle seat, to a longitudinally-running adjustment range. The longitudinally-running adjustment range is along the length of the vehicle wherein the adjustment range has a first front partial range and a second rear partial range. The disclosure also relates to a vehicle seat.

Generally, vehicle seats positioned in the front of a vehicle can be displaced forward to permit easier access to rear seats. In addition, the backrests of the vehicle seats can be folded forward. These vehicle seats are also provided with a stop device which allows the seat to return to its initial position from which the seat has been displaced toward the front. As a result, after rear seat passengers have boarded the vehicle by folding forward the seat, it is possible for the earlier adjusted position of the vehicle seat to be adopted in a simple and uncomplicated manner. Known mechanisms of this type, however, have a disadvantage in that they are constructed from a plurality of parts, so that such known mechanisms are, firstly, complicated and expensive to produce and, secondly, are liable to malfunction during the service life and are even critical to safety.

Accordingly, there is a need for a device for limiting the adjustability of a component, in particular a vehicle seat, that can be produced in a simple, easy, cost-effective manner, that can be assembled in a cost-effective manner and that is reliable during its service life.

SUMMARY

One exemplary embodiment relates to a device for limiting the adjustability of a component to a longitudinally-running adjustment range, the adjustment range having a first front partial range and a second rear partial range, wherein when the component is adjusted to a functional position different from a normal position, the adjustability of the component is limited to the first partial range.

Another exemplary embodiment relates to a vehicle seat having a device according to the disclosure.

Another exemplary embodiment relates to a system for limiting the adjustability of a vehicle seat in a vehicle, comprising a lower rail mounted to the floor of the vehicle defining a first partial range and a second partial range, an upper rail slidably attached to the lower rail such that the upper rail can be displaced relative to the lower rail to move the vehicle seat between the first partial range and the second partial range and a device arranged on the upper and lower rails, the device comprising a stop strip, having an edge, connected to the lower rail, a spring, a cam lever having a cam and an actuating lever, wherein, when the vehicle seat is in the first partial range, actuation of the actuating lever compresses the spring and transmits a force to the cam lever to move the cam against the edge of the stop strip to prevent the vehicle seat from moving to the second partial range.

Another exemplary embodiment relates to a an assembly, comprising a vehicle seat and a device that cooperates with the vehicle seat and limits the adjustability of the vehicle seat to an adjustment range, the adjustment range having a first partial range and a second partial range, wherein, when the vehicle seat is adjusted to a functional position different from a normal position, the adjustability of the vehicle seat is limited to the first partial range.

Another exemplary embodiment relates to a device for limiting the adjustability of a vehicle seat, wherein the device defines an adjustment range having a first front partial range and a second rear partial range, and wherein, when the vehicle seat is in a folded position and the vehicle seat is in the first front partial range, the device prevents the vehicle seat from moving to the second rear partial range.

DETAILED DESCRIPTION

Figure 1:
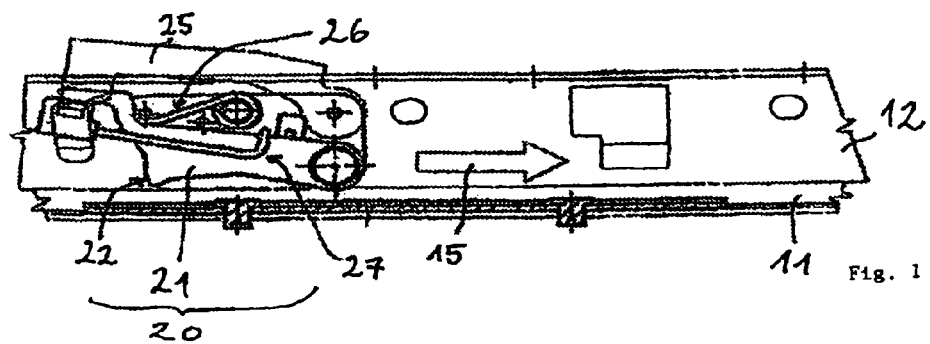
FIGS. 1-3 are side views of a device for limiting the adjustability of a component according to an exemplary embodiment.
Figure 2:
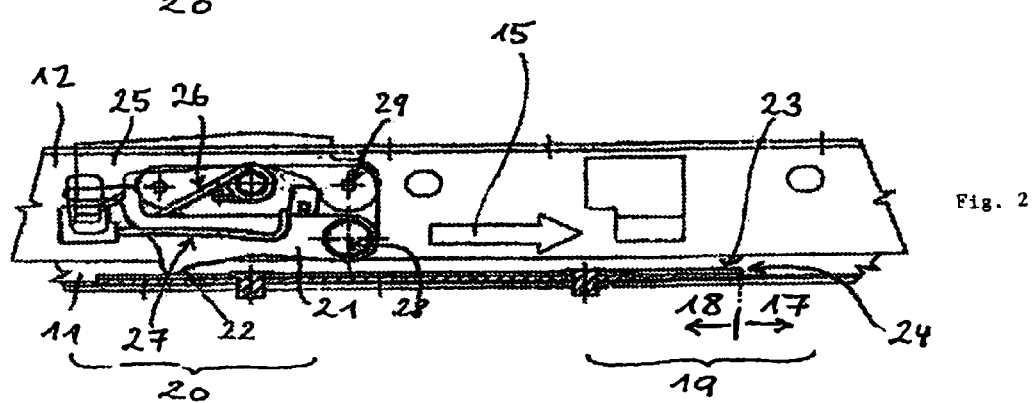
Figure 3:
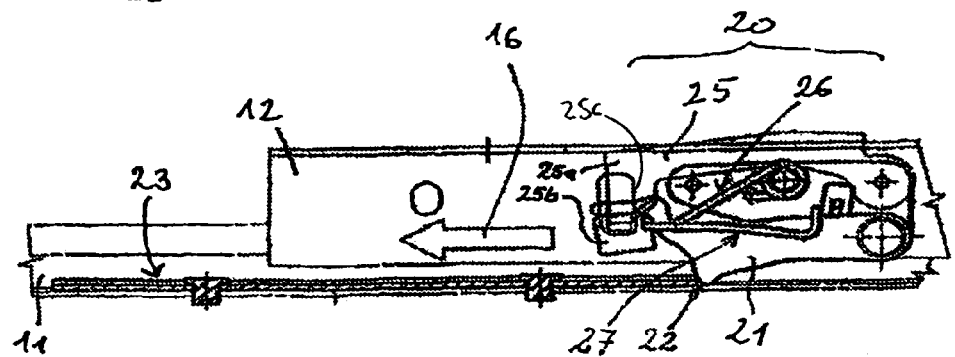

The present disclosure relates to a device 20 for limiting the adjustability of a component, in particular, a vehicle seat. FIGS. 1-3 depict the device 20.

For simplicity, the component is referred to hereinafter as a vehicle seat, so that the terms component and vehicle seat are used substantially synonymously. According to one embodiment, a component can be a vehicle seat with an easy entry function. This easy entry function displaces the vehicle seat to facilitate access for passengers, for example to the rear seats or to seats of a vehicle located behind the vehicle seat in, for example, a two-door vehicle. To facilitate the access to a rear row of seats, after folding forward the backrest of the front seat, the vehicle seat and/or the front seat may be pushed forward via the seat rails to such an extent that comfortable boarding is possible. When the seat is subsequently pushed back, the seat is intended to be held by a device 20 at a defined position which provides the boundary between a first partial range 17 of an adjustment range 19 and a second partial range 18 of the adjustment range 19, in order to indicate to a user that from this position it is necessary to fold back the backrest (see FIG. 3).

A side view of the device 20 according to one embodiment is shown in FIGS. 1 and 2, the vehicle seat (not shown fully) being adjusted in its second partial range 17 of the adjustment range 19. In FIG. 3, a side view of the device 20 according to one embodiment is also shown; however, in this case, the vehicle seat is precisely adjusted to the boundary between the first partial range 17 and the second partial range 18. The same reference numerals in different figures respectively denote the seam parts of the device 20 and/or of the vehicle seat. An upper rail 12 is longitudinally displaceably arranged on a lower rail 11 such that the upper rail 12 can be displaced in a longitudinal direction of the vehicle. Alternatively, the upper and lower rails 11, 12 may also be arranged to be displaced in a direction transverse to the vehicle longitudinal axis. Generally, the upper rail 12 is part of the vehicle seat and/or the component, but not necessarily the lower rail 11.

The upper rail 12 carries a device 20 that has a cam lever 21 with a cam 22. The lower rail 11 is provided and/or connected to a stop strip 23 so that the cam 22 is able to cooperate with the stop strip 23. The device 20 further comprises an actuating lever 25 as well as a first spring 26 and a second spring 27. According to one embodiment, it is provided, in particular, that the first spring 26 is provided integrally with the second spring 27 so that a twofold spring action, corresponding to the springs 26, 27, may be implemented from such a component. The first spring 26 causes the actuating lever 25 to lift, i.e., a movement and/or a force which causes a removal of the cam 22 from the stop strip 23. The second spring 27 (and/or the second part of an integrally provided spring) effects a lowering of the cam lever 21, i.e., a movement and/or a force which causes the cam 22 to approach the stop strip 23. This effect is produced by the different fulcrums 29 and/or 28 of the actuating lever 25 and/or cam lever 21. In an exemplary embodiment, the actuating lever 25 has a main part 25a (see FIG. 3) and a secondary part 25b connected thereto, for example by means of a plug connection 25c, from which the second spring 27 extends in the direction approximately parallel to the cam lever 21. The entire device 20 can be substantially produced from metal; the secondary part 25b, however, can be produced from plastic material.

The device 20 functions as follows: by an actuation i.e., a lowering of, the actuating lever 25, the second spring 27 is compressed (see the difference between FIG. 1 and FIG. 2 for the second spring 27) and transmits a force, which rotates the cam 22 downward, onto the cam lever 21. If the vehicle seat is in the second partial range 18 of the adjustment range 19 (as illustrated in FIG. 2), the cam 22 merely presses against the stop strip 23. A displacement of the vehicle seat causes the cam to rub slightly against the stop strip 23. The vehicle seat in the first partial range 17 of the adjustment range 19 is shown in FIG. 3. Even here the second spring 27 presses the cam lever downward, but further than shown in FIG. 2 because the stop strip 23 is not in the way. At this time, the vehicle seat is substantially freely movable, exclusively in the first partial range 17 of the adjusting range 19, namely both to the front (arrow 15) and to the rear (arrow 16). If, however, the vehicle seat strikes the boundary of the first partial range 17 with the second partial range 18 of the adjustment range 19, as shown in FIG. 3, the cam 22 strikes an edge 24 of the stop strip 23. The stop strip 23 (in particular with its edge 24) and the cam 22 prevent the vehicle seat from moving in a rearward direction (arrow 16) into the second partial range 18 of the adjustment range 19. As a result, the adjustability of the vehicle seat is limited.

In an exemplary embodiment, the actuation of the actuating lever 25 by means of actuators, for example Bowden cables, is effected by the movement and/or positional alteration of the backrest of the vehicle seat relative to the seat part. Accordingly, the actuating lever 25 is connected by corresponding means, which are not shown in the figures, to the backrest and/or its swivel mechanism (not shown).

The actuating connection disclosed above between the adjustment of the backrest of the vehicle seat and the device according to the invention is naturally canceled when the backrest is again adjusted into its normal position relative to the seat part. The vehicle seat is therefore located again in its normal position (irrespective of whether the vehicle seat is adjusted in its first partial range 17 or in its second partial range 18). In this case, the actuation of the actuating lever 25 stops and the actuating lever 25 is moved upward, together with the cam lever 21, so that the vehicle seat is able to move back (arrow 16), entirely irrespective of the location of the transition between the first partial range 17 and the second partial range 18, i.e., the location of the edge 24.

An exemplary embodiment of the device limits the adjustability of the component, such as a vehicle seat, to the first partial range should the component be adjusted to a functional position different from the normal position thereof. As a result, not every adjusted position of the component, which has originally been adjusted by a user, is able to be independently retrieved, but a construction of the device is possible that is able to be designed in a manner that is considerably simpler and is also more robust at the same cost.

In an exemplary embodiment, the component has a seat part and a backrest, and, in the functional position, the backrest can swivel relative to the normal position, and in particular it can swivel toward the front. In vehicle seats with a seat part and a backrest, not only is the backrest designed to be able to be folded forward (and/or generally "out of the way") to facilitate the boarding and disembarking of people, but also the seat part is intended to be displaced longitudinally. The vehicle seat can include a stop to limit longitudinal displacement of the seat part so that, when the seat part is moved back to its initial position, the seat part is not able to be displaced further to the rear before the backrest is again adjusted into its normal position relative to the seat part, the seat, and/or the component.

The component can have a cam lever comprising a cam, and the component can cooperate with a stop strip. The stop strip can be arranged in the region of the cam when the component is adjusted in its second partial range. As a result, by simple means, a variable and simultaneously robust implementation of the device is possible. For example, for different vehicle models, the stop strip may be designed to be of different lengths, so that an adaptation to different vehicle types may be very easily implemented.

Movement of the cam into the region of the stop strip may be effected by adjustment of the functional position. It is, therefore, possible to implement the device to be "invisible" for a user, i.e., a user obtains the functionality of the device, without having to undertake a further actuation in a complicated manner. The user can simply move the backrest of the seat, for example to the side or to the front, by folding the backrest forward.

Should the component be adjusted in the first partial range of the adjustment range, movement of the cam prevents a displacement of the component into the second partial range of the adjustment range and/or, should the component be adjusted in the second partial range of the adjustment range, movement of the cam causes the cam to press against the stop strip. As a result, in a mechanically simple but very robust and long-lived manner, the adjustability of the component and/or of the vehicle seat may be limited, on the one hand, and faulty operation of the device is prevented, on the other hand.

A vehicle seat with a device for limiting the adjustability of the vehicle seat thus may be designed to be particularly simple, robust and cost-effective, but may nevertheless have a large range of functions.

The invention claimed is:

1. A device for limiting the adjustability of a component to a longitudinally-running adjustment range, the adjustment range having a first front partial range and a second rear partial range, comprising:
   a cam lever;
   an actuating lever having a main part and a secondary part connected to the main part;
   a first spring configured to force the cam lever toward a direction;
   a second spring configured to force the cam lever toward an opposing direction, wherein the second spring is provided integrally with the first spring, wherein when the component is adjusted to a functional position different from a normal position, the adjustability of the component is limited to the first partial range;
a cam on the cam lever; and
a stop strip arranged in the region of the cam to cooperate with the cam when the component is in the second rear partial range, wherein the first spring is configured to force the cam lever away from the stop strip,
wherein the actuating lever is arranged such that the first spring causes the actuating lever to lift which causes a removal of the cam from the stop strip.

2. A vehicle seat having a device as claimed in claim 1.

3. The device as claimed in claim 1, wherein the device is arranged on an upper rail and a lower rail, and wherein the upper rail is slidably attached to a lower rail such that the upper rail can be displaced in a longitudinal direction of a vehicle.

4. The device as claimed in claim 1, wherein the device is arranged on an upper rail and a lower rail, and wherein the upper rail is slidably attached to a lower rail such that the upper rail can be displaced in a transverse direction of a vehicle.

5. The device as claimed in claim 1, wherein the second spring is configured to force the cam lever toward the stop strip.

6. The device as claimed in claim 1, further comprising an actuation lever that engages the cam lever, wherein the first spring engages the actuation lever.

7. The device as claimed in claim 1, wherein the actuating lever is arranged such that when the component is in the first front partial range, actuation of the actuating lever compresses the second spring and transmits a force to the cam lever to move the cam against the edge of a stop strip to prevent the component from moving to the second rear partial range.

8. The device as claimed in claim 1, wherein the main part and secondary part are connected by a plug connection, and wherein the second spring extends from the plug connection in a direction approximately parallel with the cam lever.

9. The device as claimed in claim 1, wherein the secondary part is produced from a plastic material.

10. A system for limiting the adjustability of a vehicle seat in a vehicle, comprising:
a lower rail mounted to the floor of the vehicle defining a first partial range and a second partial range;
an upper rail slidably attached to the lower rail such that the upper rail can be displaced relative to the lower rail to move the vehicle seat between the first partial range and the second partial range; and
a device arranged on the upper and lower rails, the device comprising:
a stop strip, having an edge, connected to the lower rail;
a cam lever having a cam;
a first spring configured to force the cam lever toward a direction;
a second spring configured to force the cam lever toward an opposing direction, wherein the second spring is provided integrally with the first spring; and
an actuating lever having a main part and a secondary part connected to the main part;
wherein, when the vehicle seat is in the first partial range, actuation of the actuating lever compresses the second spring and transmits a force to the cam lever to move the cam against the edge of the stop strip to prevent the vehicle seat from moving to the second partial range,
wherein the actuating lever is arranged such that the first spring causes the actuating lever to lift which causes a removal of the cam from the stop strip.

11. The system as claimed in claim 10, wherein the stop strip arranged in the region of the cam to cooperate with the cam in the second rear partial range, wherein the first spring is configured to force the cam lever away from the stop strip.

12. The system as claimed in claim 10, wherein the main part and secondary part are connected by a plug connection, and wherein the second spring extends from the plug connection in a direction approximately parallel with the cam lever.

13. The system as claimed in claim 10, wherein the secondary part is produced from a plastic material.

14. An assembly, comprising:
a vehicle seat; and
a device that cooperates with the vehicle seat and limits the adjustability of the vehicle seat to an adjustment range, the adjustment range having a first partial range and a second partial range, said device, comprising:
a cam lever;
an actuating lever having a main part and a secondary part connected to the main part;
a first spring configured to force the cam lever toward a direction;
a second spring configured to force the cam lever toward an opposing direction, wherein the second spring is provided integrally with the first spring,
wherein, when the vehicle seat is adjusted to a functional position different from a normal position, the adjustability of the vehicle seat is limited to the first partial range,
a cam on the cam lever; and
a stop strip arranged in the region of the cam to cooperate with the cam when the vehicle seat is in the second rear partial range, wherein the first spring is configured to force the cam lever away from the stop strip,
wherein the actuating lever is arranged such that the first spring causes the actuating lever to lift which causes a removal of the cam from the stop strip.

15. The assembly as claimed in claim 14, wherein the vehicle seat has a seat part and a backrest, and wherein, in the functional position, the backrest is configured to swivel toward a front of a vehicle relative to the normal position.

16. The assembly as claimed in claim 14, wherein the cam is moved into the region of the stop strip by an adjustment of the vehicle seat into the functional position.

17. The assembly as claimed in claim 16, wherein, when the vehicle seat is moved into the first partial range of the adjustment range, the movement of the cam prevents a displacement of the vehicle seat into the second partial range of the adjustment range.

18. The assembly as claimed in claim 16, wherein, when the vehicle seat is moved in the second partial range of the adjustment range, the movement of the cam causes the cam to press against the stop strip.

19. An assembly as claimed in claim 14, wherein the adjustment range is a longitudinally-running adjustment range, the first partial range is a first front partial range, and the second partial range is a second rear partial range.

20. The assembly as claimed in claim 14, wherein the second spring is configured to force the cam lever toward the stop strip.

21. The assembly as claimed in claim 14, wherein the actuating lever is arranged such that when the vehicle seat is in the first partial range, actuation of the actuating lever compresses the second spring and transmits a force to the cam lever to move the cam against the edge of a stop strip to prevent the vehicle seat from moving to the second partial range.

22. The assembly as claimed in claim 14, wherein the main part and secondary part are connected by a plug connection, and wherein the second spring extends from the plug connection in a direction approximately parallel with the cam lever.

23. The assembly as claimed in claim 14, wherein the secondary part is produced from a plastic material.

24. A device for limiting the adjustability of a vehicle seat, comprising:
   a cam lever;
   an actuating lever having a main part and a secondary part connected to the main part;
   a first spring configured to force the cam lever toward a direction;
   a second spring configured to force the cam lever toward an opposing direction, wherein the second spring is provided integrally with the first spring,
   wherein the device defines an adjustment range having a first front partial range and a second rear partial range, and wherein, when the vehicle seat is in a folded position and the vehicle seat is in the first front partial range, the device prevents the vehicle seat from moving to the second rear partial range;
   a cam on the cam lever; and
   a stop strip arranged in the region of the cam to cooperate with the cam when the vehicle seat is in the second rear partial range, wherein the first spring is configured to force the cam lever away from the stop strip,
   wherein the actuating lever is arranged such that the first spring causes the actuating lever to lift which causes a removal of the cam from the stop strip.

25. The device as claimed in claim 24, wherein the second spring is configured to force the cam lever toward the stop strip.

26. The device as claimed in claim 24, wherein the actuating lever is arranged such that when the vehicle seat is in the first front partial range, actuation of the actuating lever compresses the second spring and transmits a force to the cam lever to move the cam against the edge of a stop strip to prevent the vehicle seat from moving to the second rear partial range.

27. The device as claimed in claim 24, wherein the main part and secondary part are connected by a plug connection, and wherein the second spring extends from the plug connection in a direction approximately parallel with the cam lever.

28. The device as claimed in claim 24, wherein the secondary part is produced from a plastic material.

* * * * *